United States Patent
Jaatinen et al.

(10) Patent No.: US 11,550,689 B2
(45) Date of Patent: Jan. 10, 2023

(54) SYSTEM AND METHOD FOR MEASURING NAVIGATION OF A COMPUTER APPLICATION

(71) Applicants: Atlassian Pty Ltd., Sydney (AU); Atlassian Inc., San Francisco, CA (US)

(72) Inventors: Sami Tapani Jaatinen, Sydney (AU); Anand Gupta, Sydney (AU); Raymond Rui Su, Sydney (AU); Hong Phong Nguyen, Sydney (AU); Maximillian Peter Heinz, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 380 days.

(21) Appl. No.: 16/911,091

(22) Filed: Jun. 24, 2020

(65) Prior Publication Data
US 2020/0408554 A1    Dec. 31, 2020

(30) Foreign Application Priority Data
Jun. 28, 2019 (AU) ................... 2019902286

(51) Int. Cl.
*G06F 9/44* (2018.01)
*G06F 11/34* (2006.01)

(52) U.S. Cl.
CPC ...... *G06F 11/3438* (2013.01); *G06F 2201/86* (2013.01)

(58) Field of Classification Search
None
See application file for complete search history.

(56) References Cited

U.S. PATENT DOCUMENTS

| | | | |
|---|---|---|---|
| 10,198,524 B1 * | 2/2019 | Amalapurapu | G06F 16/958 |
| 10,958,540 B1 * | 3/2021 | Lilley | H04L 41/5064 |
| 2012/0131212 A1 * | 5/2012 | Tang | G01C 21/3423 |
| | | | 709/228 |
| 2015/0241225 A1 * | 8/2015 | Liu | G08G 1/0968 |
| | | | 701/540 |

* cited by examiner

*Primary Examiner* — Qamrun Nahar
(74) *Attorney, Agent, or Firm* — Brownstein Hyatt Farber Schreck, LLP

(57) ABSTRACT

Described herein is a computer implemented method comprising receiving a navigation event generated at an application; determining the navigation event is a start navigation session event and recording the event as a startpoint of a navigation session; determining an end of the navigation session has occurred and, in response, recording an endpoint of the navigation session. The method further comprises calculating a navigation session metric for the navigation session; determining a particular category of the navigation session; and determining a measure of navigation success for the navigation session based on the navigation session metric and particular category.

20 Claims, 7 Drawing Sheets

SYSTEM AND METHOD FOR MEASURING NAVIGATION OF A COMPUTER APPLICATION

CROSS-REFERENCE TO RELATED APPLICATION(S)

This application claims the benefit of Australian patent application no. AU2019902286, filed Jun. 28, 2019 and titled "System and Method for Measuring Navigation of a Computer Application," the disclosure of which is hereby incorporated herein by reference in its entirety.

TECHNICAL FIELD

The present disclosure is generally directed to monitoring the performance of a computer application and, more specifically, directed to systems and techniques for quantifying navigation efficiency of a computer application.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Analysing navigation of an application can be difficult. This is in part because many applications are designed to be versatile to suit the needs of different users. Navigation can vary in design through a simple web application that contains a few main pages in comparison to multi-level architecture. Content can also vary between logged-in users and logged-out users and more. Furthermore, in many applications there are several ways in which a user can achieve the same end (e.g. reach a particular control for performing a particular function or reach particular content).

Because navigation has so many differences between applications, there are no set guidelines for organizing navigation. This is significant because the feedback and analysis from navigation could be used for improving navigation.

As a result, there exist few solutions for determining navigation of an application, and of those that do exist many are problematic because they are obtrusive for the user. Therefore there is a need for an ability to measure and analyse navigation of an application. Such analysis can be used in various ways, for example to improve or even optimise the navigation and user interface. One advantage of improving application navigation is that it reduces the time and navigational effort required for users to find information.

SUMMARY

Some example embodiment are directed to a computer implemented method. The computer implemented method may include: receiving a navigation event generated at an application and processing the navigation event to determine if it is a start navigation session event. In response to determining the navigation event is the start navigation session event, recording the navigation event as a startpoint of a navigation session. The method may also include determining an end of the navigation session has occurred and, in response, recording an endpoint of the navigation session. A navigation session metric may be calculated for the navigation session and a particular category of the navigation session may be determined. The method may also include determining a measure of navigation success for the navigation session based on the navigation session metric and the particular category.

Some example embodiments are directed to a computer system comprising: a processing unit and one or more non-transitory computer-readable storage media storing sequences of instructions which, when executed by the processing unit, cause the processing unit to perform various operations. Specifically, the processing unit may be configured to: receive a navigation event generated at an application; process the navigation event to determine if it is a start navigation session event and, in response to determining the navigation event is the start navigation session event, record the navigation event as a startpoint of a navigation session; determine an end of the navigation session has occurred and, in response, record an endpoint of the navigation session; calculate a navigation session metric for the navigation session; determine a particular category of the navigation session; and determine a measure of navigation success for the navigation session based on the navigation session metric and the particular category.

Figure 1:
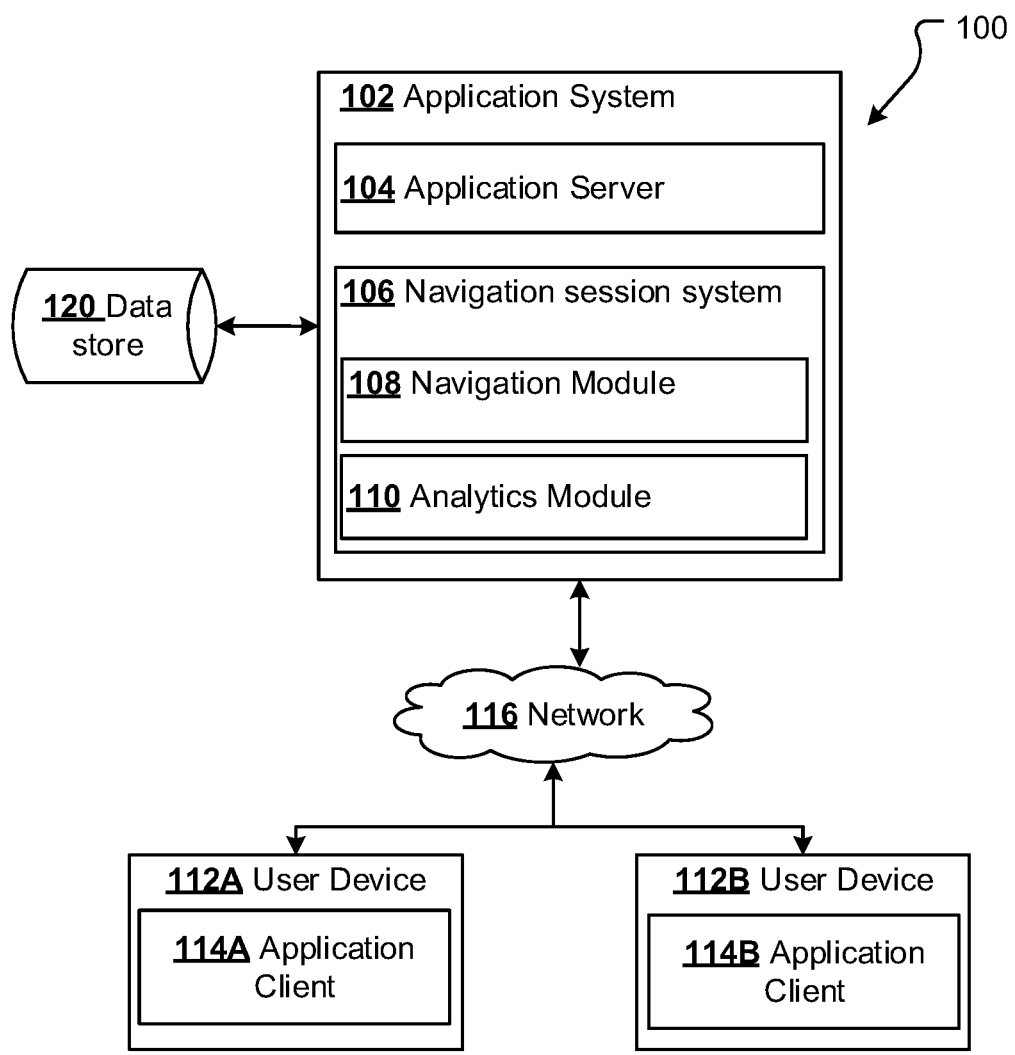
FIG. 1 is a block diagram illustrating an example environment in which features of the present disclosure can be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

This disclosure refers to detecting and analysing a navigation session in an application. The concept of a navigation session is based on the understanding that users are often using an application user interface to find something specific—e.g. a particular control (which can be activated by the user to perform a particular function), or particular content. Therefore, a navigation session is the journey taken by a user to get from an origin (or startpoint) to their intended destination within the application.

At a high level, this disclosure provides a method of determining and recording a navigation session. The method comprises determining a navigation startpoint (which indicates a beginning of a navigation session), determining a navigation endpoint (which indicates an end of a navigation session), and establishing a navigation session from the navigation startpoint to the navigation endpoint. The navigation session indicates the navigation path of one or more interactions with the application by the user to navigate from the navigation startpoint to the navigation endpoint.

One technique of determining a navigation session is to provide explicit interface controls to start and end a navigation session. For example, before starting to navigate to a particular destination, a user activates a 'commence navigation session' control, and once the user has reached the destination (or abandoned the navigation attempt) he or she activates an 'end navigation session' control. Determining navigation sessions in this way, however, requires introducing interface controls and can affect the way in which the user interacts with the application.

In certain embodiments described herein, therefore, navigation sessions are automatically detected based on typical or usual user interaction with an application, such that the commencement and termination of a navigation session is automatically determined by a system based on 'normal' user interaction. In these embodiments, a user does not actively begin or end a navigation session by, for example, explicitly activating 'start' and/or 'end' navigation session controls. Instead, the user interacts with the application as they would normally and the system processes the user interactions to infer commencement and termination of a particular navigation session from those actions. In the described embodiments, a separate component (referred to herein as the navigation session system) processes events produced by the application and makes determinations about navigation sessions based on these events.

Automatic detection of navigation sessions is less intrusive to a user than requiring explicit activation of start/end session controls. However, this also introduces complexities. For example, the intention to commence a navigation session (i.e., a series of interactions in which a user is intending to navigate to a particular control or functionality) can be difficult to infer as it is possible that the same user interaction with an application may be the start of a navigation session, or may simply be a user interacting with the application without a particular goal in mind (e.g., clicking through the application to understand how it works, or browsing).

In order to provide illustrative examples, much of this disclosure is described in relation to Jira®, an issue tracking system (ITS) application made available by Atlassian. The techniques and features described herein can, however, be applied to any application (or website) in which users can navigate between user interface components (or webpages) in order to find a particular piece of information or perform a particular action.

In the present disclosure, events are generated whenever a user performs an action on a user interface provided by an application—e.g. clicking/contacting on a user interface element, moving a cursor around, or other interactions. In this disclosure 'events' and 'actions' are often used interchangeably. Events are detected and recognised by the application in question which performs certain responses based thereon—e.g. navigating to an alternative page/interface of the application, causing particular processing to be performed, etc. This disclosure is based on an event model that allows for events to be processed by a listener or event handler. This is for illustrative purposes and similar approaches as described here can be used for other types of models.

In this disclosure, the system detects the start of a navigation session and end of a navigation session. Generally speaking, detecting the start of a navigation session involves determining that a particular event (generated by a user interacting with the application) indicates the start of a navigation session. Detecting the end of a navigation session is similar and may also involve determining that a particular event indicates the end of a navigation session (the events for ending a navigation session typically being different to the events that start a navigation session). Determining the end of a navigation session may also (or alternatively) involve detecting that a user has actively dwelled on a page for at least a specified period of time, or detecting that the user has abandoned the session (e.g. by exiting the application or taking no action within a defined time period).

A predefined event that ends a navigation session may be dependent on the application. For example a predefined event in Jira may be updating an issue. Actively dwelling on a page may indicate that the user has either found the correct page or given up on the navigation. Abandoning the session includes determining that the active tab has been closed and/or determining a period of inactivity.

FIG. 1 illustrates an example environment 100 in which embodiments and features of the present disclosure are implemented. Example environment 100 includes a communications network 116 which interconnects user devices 112 (e.g. 112A and 112B) and an application system 102.

Each user device 112A, 112B is a computer system with an application client 114A, 114B installed thereon.

When executed by a user device 112 (e.g. by a processor thereof, such as processing unit 140 described below), the application client 114 configures the user device 112 to provide client-side system functionality by communicating (using a communication interface such as 164 described below) with the application system 102 (for example with an application server 104 running on the application system 102). The actual application client 114 may vary depending on the application. For example, the application client 114 may be a dedicated application client that communicates with the application system 102 using an application programming interface (API). Alternatively, the application client 114 may be a web browser (such as Chrome, Safari, Internet Explorer, Firefox, or an alternative web browser) which communicates with the application system 102 using http/https protocols.

User device 112 may be any form of computing device. Typically, user device 112 will be a personal computing device—e.g., a desktop computer, laptop computer, tablet computer, a smart phone, or other device.

Application system 102 includes an application server 104 and navigation session system 106. The application server 104 configures the application system 102 to provide server side application functionality—e.g. receiving and responding to requests from applications clients (e.g., application client 114 on user device 112) and storing/retrieving data from the data store 120 as required.

Application server 104 may be a web server (for interacting with web browser clients) or an application server (for interacting with dedicated application clients). While application system 102 has been illustrated with a single application server 104, the application system 102 may provide multiple servers (e.g., one or more web servers and/or one or more application servers).

The navigation session system 106 (running on application system 102) and application client 114 (running on user devices 112A, 112B) operate together to provide the navigation session system functionality. Generally speaking, the navigation session system 106 listens for events relating to actions which may be performed by the application client 114 (operating on user device 112A), the application server 104 (operating on the application system 102), or the application client 114 and application server 104 in cooperation.

Generally speaking, operations involving the display of user information involve displaying information by the user device 112 as controlled by the application client 114. The data displayed, however, may be generated by the application client 114 itself, or generated by the application server 104 and communicated to the application client 114 for display.

Generally speaking, operations involving user input involve the user device 112 receiving user input and passing that input to the application client 114. The information input may be processed by the application client 114 itself, or communicated by the application client 114 to the application system 102 to be processed by the application server 104 and/or navigation session system 106.

Generally speaking, operations involving writing data to the data store 120 involve the application server 104 or navigation session system 106 communicating with the data store. The data written to the data store 120 may, however, be communicated to the application server 104 or navigation session system 106 by the application client 114.

In the present example, the navigation session system 106 includes a navigation module 108 and an analytics module 110. The navigation module 108 contains the logic and code for monitoring navigation of a user via the application client 114 on the user device 112. In particular, the navigation module determines whether a navigation session is or was established by the application client 114 on user device 112.

The analytics module 110 includes logic and code for analysing navigation sessions. The analytics module 110 utilises the output of the navigation module 108. By analysing navigation sessions the analytics module 110 can determine a score for how a user, or group of users, is utilising an application and determine whether there are potential inefficiencies in the application and/or its user interface.

In the embodiments described below, various operations are described as being performed by the navigation session system 106. In alternative embodiments, however, operations described as being performed by the navigation session system 106 can instead be performed by the application client 114.

Figure 2:
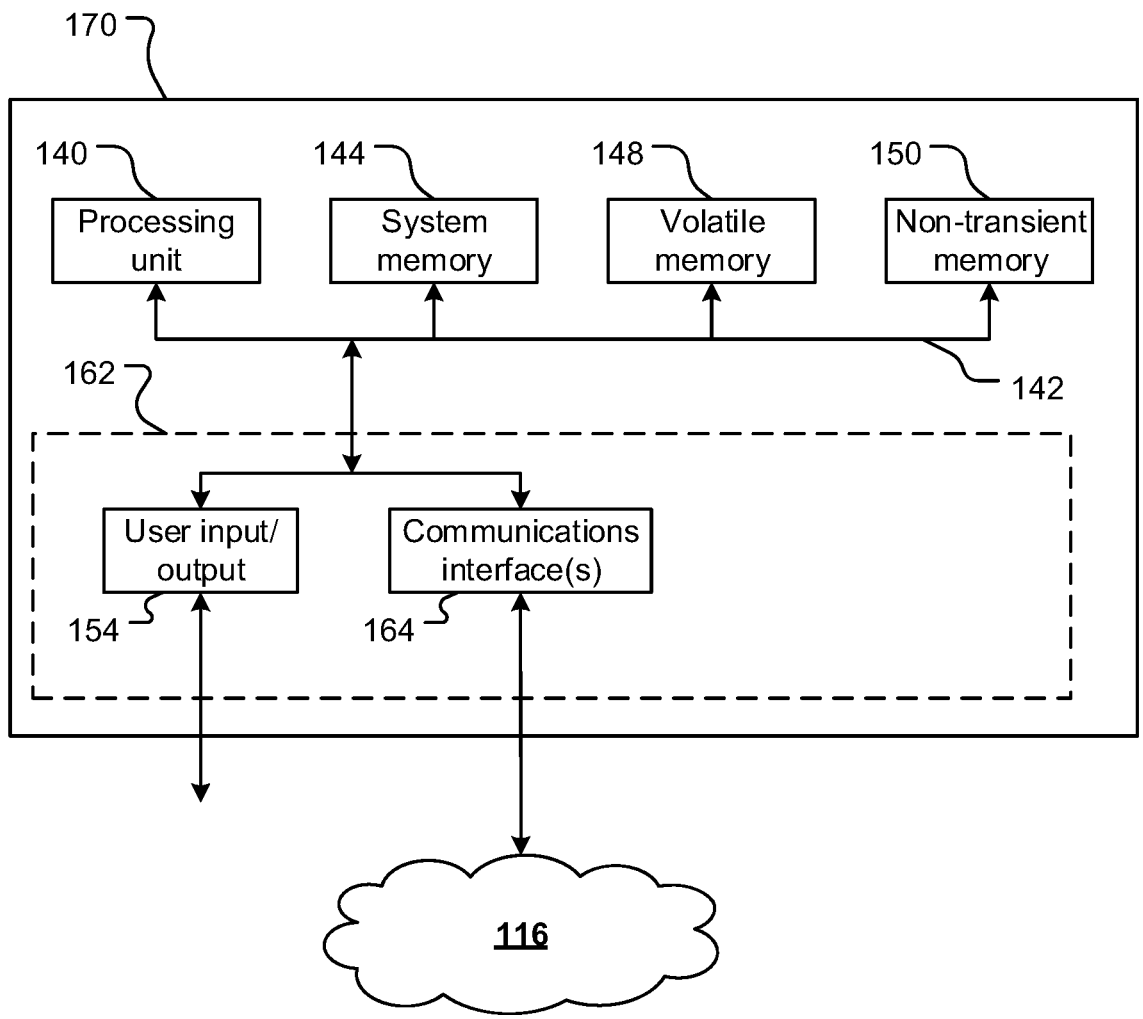
FIG. 2 is an example computer system.

FIG. 2 provides a block diagram of one example of a computer system 170. System 170 is a general-purpose computer system. It will be appreciated that FIG. 2 does not illustrate all functional or physical components of a computer system. For example, no power supply or power supply interface has been depicted, however system 170 either carries a power supply or is configured for connection to a power supply (or both). It will also be appreciated that the particular type of computer system determines the appropriate hardware and architecture, and alternative computer systems suitable for implementing aspects of the present disclosure may have additional, alternative, or fewer components than those depicted, combine two or more components, and/or have a different configuration or arrangement of components.

The computer system 170 includes at least one processing unit 140. The processing unit 140 may be a single computer-processing device (e.g. a central processing unit, graphics processing unit, or other computational device), or may include a plurality of computer processing devices. In some instances processing is performed by processing unit 140, however in other instances processing may also, or alternatively, be performed by remote processing devices accessible and useable (either in a shared or dedicated manner) by the system 170.

Through a communications bus 142 the processing unit 140 is in data communication with a one or more machine-readable storage (memory) devices that store instructions and/or data for controlling operation of the processing unit 140. In this instance, system 170 includes a system memory 144 (e.g. a BIOS), volatile memory 148 (e.g. random access memory such as one or more DRAM modules), and non-volatile memory 150 (e.g. one or more hard disk or solid state drives).

System 170 also includes one or more interfaces, indicated generally by 162 via which system 170 interfaces with various devices and/or networks. Generally speaking, other devices may be physically integrated with system 170, or may be physically separate. Where a device is physically separate from system 170, connection between the device and system 170 may be via wired or wireless hardware and communication protocols, and may be a direct or an indirect (e.g. networked) connection.

Wired connection with other devices/networks may be by any appropriate standard or proprietary hardware and connectivity protocols. For example, system 170 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 170 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which system 170 connects—whether by wired or wireless means—allow data to be input into/received by system 170 for processing by the processing unit 140, and data to be output by system 170. Example devices are described below, however it will be appreciated that not all computer-processing systems will include all mentioned devices, and that additional and alternative devices to those mentioned may well be used.

For example, system 170 may include or connect to one or more input devices by which information/data is input into (received by) system 170. Such input devices may include physical buttons, alphanumeric input devices (e.g. keyboards), pointing devices (e.g. mice, track pads and the like), touchscreens, touchscreen displays, microphones, accelerometers, proximity sensors, GPS devices and the like. System 170 may also include or connect to one or more output devices controlled by system 170 to output information. Such output devices may include devices such as indicators (e.g. LED, LCD or other lights), displays (e.g. CRT displays, LCD displays, LED displays, plasma displays, touch screen displays), audio output devices such as speakers, vibration modules, and other output devices. System 170 may also include or connect to devices which may act as both input and output devices, for example memory devices (hard drives, solid state drives, disk drives, compact flash cards, SD cards and the like) which system 170 can read data from and/or write data to, and touch-screen displays which can both display (output) data and receive touch signals (input).

System 170 may also connect to communications networks (e.g. the Internet, a local area network, a wide area network, a personal hotspot etc.) to communicate data to and receive data from networked devices, which may themselves be other computer systems.

It will be appreciated that system 170 may be any suitable computer system such as, by way of non-limiting example, a desktop computer, a laptop computer, a netbook computer, tablet computer, a smart phone, a Personal Digital Assistant (PDA), a cellular telephone, a web appliance. Although the system 170 may act as a server in a client/server type architecture, the system 170 may also include user input/output directly via the user input/output interface 154 or alternatively receiving equivalent input/output of a user via a communications interface 164 for communication with a network such as network 116.

The number and specific types of devices which system 170 includes or connects to will depend on the particular type of system 170. For example, if system 170 is a desktop computer it will typically connect to physically separate devices such as (at least) a keyboard, a pointing device (e.g. mouse), a display device (e.g. a LCD display). Alternatively, if system 170 is a laptop computer it will typically include (in a physically integrated manner) a keyboard, pointing device, a display device, and an audio output device. Further alternatively, if system 170 is a tablet device or smartphone, it will typically include (in a physically integrated manner) a touchscreen display (providing both input means and display output means), an audio output device, and one or more physical buttons. To the extent that system 170 is an example of a user device 112, then the user input devices as described above will typically be the means by which a user will interact with a system to generate the events relevant to the navigation session system 106. A person skilled in the art would understand there may be other types of input devices which would operate similarly for the purposes of the present disclosure, such as a microphone for voice activated user commands or other devices not described here.

System 170 stores or has access to instructions and data which, when processed by the processing unit 140, configure system 170 to receive, process, and output data. Such instructions and data will typically include an operating system such as Microsoft Windows®, Apple OSX, Apple IOS, Android, Unix, or Linux.

System 170 also stores or has access to instructions and data (i.e. software) which, when processed by the processing unit 140, configure system 170 to perform various computer-implemented processes/methods in accordance with embodiments described herein. It will be appreciated that in some cases all of a given computer-implemented method will be performed by system 170 itself, while in other cases processing may be performed by other devices in data communication with system 170.

Instructions and data are stored on a non-transient machine-readable medium accessible to system 170. For example, instructions and data may be stored on non-volatile memory 150. Instructions may be transmitted to/received by system 170 via a data signal in a transmission channel enabled (for example) by a wired or wireless network connection.

In this disclosure, a user's navigation journey while using an application (e.g. application client 114) involves the user navigating from an origin to a destination. In this disclosure, an 'origin' is a place in an application where a user starts navigating to a particular goal or destination. A 'destination' is a place the user intends to navigate to. The user may navigate from an origin to a destination via one or more interstitial places.

In this disclosure, a 'place' includes any user interface component such as a menu item, list item, link, widget or webpage, that is displayed to the user or that the user interacts with. The user may navigate to places in an application between the origin and the destination. These places may be referred to as 'interstitial' as (for a given navigation session) they are neither the origin nor the destination. It will be appreciated that what is an interstitial place in one navigation session may well, for example, be the destination for a different navigation session.

The navigation session system 106 determines a navigation session of a user that corresponds to this navigation journey of the user.

Initially the navigation session system 106 determines a navigation session startpoint which is a point that marks the beginning of a navigation session. In this disclosure, a navigation session startpoint is determined from a navigation event that corresponds to a session start action. A session start action is a user interaction with the application user interface that causes a new navigation session to be started.

Subsequently the navigation session system 106 determines if any actions or events represent a navigation session endpoint, which is the corresponding end of the navigation session.

In some embodiments, the end of a navigation session can be triggered from user inactivity. In this case, the navigation session system 106 can, for example, initialise an event timer each time an event is received. If the event timer reaches a navigation session timeout period without a further event occurring, the navigation session system 106 determines the navigation session to have ended (the failure to receive an event within the session timeout period indicating that the user has not interacted with the application over that period). If a further event occurs before the session timeout period expires, the event timer is reset.

In addition, or alternatively, the end of a navigation session can be triggered by an event corresponding to a session end action. A session end action is an interaction with the application user interface that will cause a navigation session to be ended. One or more touchpoints together comprise the path that the user navigates between a startpoint and endpoint. Most user interactions following the start of a navigation session that are not session end actions (that is, those actions that end a navigation session) will be recorded as touchpoints. In some cases, certain types of user interactions (such as a performing search or switching browser windows) may instead pause the navigation session. The user may then return and perform a user action which the system identifies as resuming the session.

Figure 3:
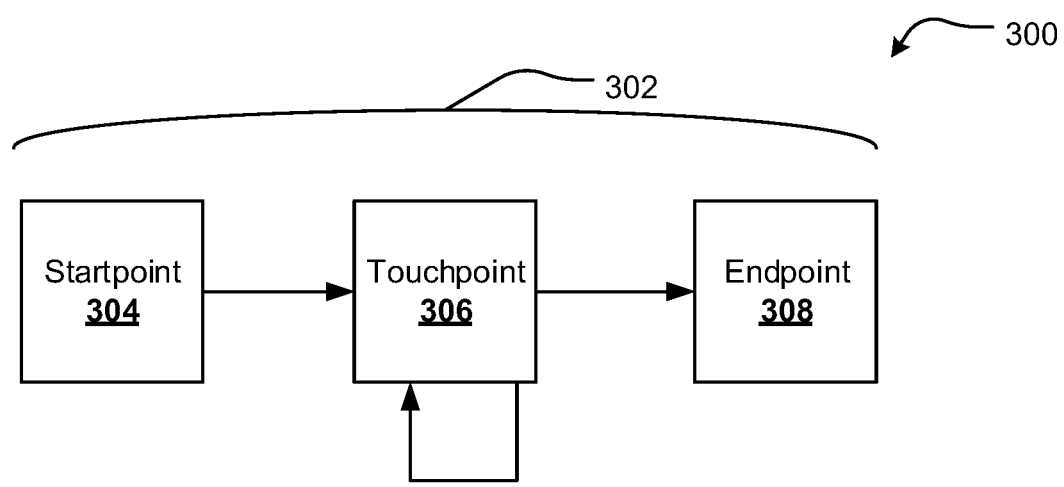
FIG. 3 illustrates a high level overview of how a navigation session system determines a navigation session.

FIG. 3 depicts a conceptual example 300 that illustrates how the present disclosure operates. A navigation session 302 is detected by determining a startpoint 304, which as explained below can be any action that a user performs that the system is configured to interpret as an intention to navigate. Following a startpoint are zero or more touchpoints 306 are determined, which are intermediate steps that are performed by the user in the navigation session. The navigation session then ends at the endpoint 308. In some cases, a user will go from a startpoint 304 via a touchpoint 306 to the endpoint 308. In other cases, a user may go from a startpoint 304 directly to an endpoint 308.

By way of further illustration, a navigation session 302 may involve a user performing an action by clicking on a navigation item. This raises a navigationItem clicked event. The navigation session system 106 identifies this event as one that corresponds to a session start action, so this event is recorded as a navigation session startpoint 304. The user subsequently clicks on an issue, which generates an 'Issue-Modal Opened' event. In this example, the event is determined not to correspond to a session end action. Accordingly, the 'IssueModal Opened' event is recorded as a touchpoint 306 and the navigation session continues. The user then performs an action to update the status of the issue, which generates an IssueStatus Updated event. The navigation session system 106 determines this event corresponds to a session end action and, therefore, determines that the navigation session 302 ends (the endpoint 308 being the IssueStatus updated event).

As a further illustration, a navigation session may involve a user clicking on a board switcher interface item, which opens a board switcher. This creates a 'BoardSwitcher Opened' event. The navigation session system 106 identifies this event as one that corresponds to a session start action, so this event is recorded as a navigation session startpoint 304. The user subsequently clicks on a different board, which generates a 'BoardSwitcherItem Clicked' event. In this example, the event is determined not to correspond to a session end action. Accordingly, the 'BoardSwitcherItem Clicked' event is recorded as a touchpoint 306 and the navigation session continues. The user then updates the board, which generates a 'Board Updated' event. The navigation session system 106 determines this event corresponds to a session end action and, therefore, determines that the navigation session 302 ends (the navigation session endpoint 308 being the Board Updated event).

Navigation touchpoints such as 306 are interactions performed as part of a user's navigation session 302. Touchpoints do not end the navigation session so a navigation session 302 should continue based on the interaction with the navigation touchpoints rather than ending as they would with an endpoint 308. Most actions in an application that occur after the start of a navigation session that are not endpoints 308 associated with navigation end actions can be a navigation session touchpoint 306. In certain embodiments, however, there may be certain actions or events that pause (and subsequently resume) a navigation session.

Although they do not define a startpoint 304 or endpoint 308 of a navigation session 302, touchpoints 306 can be used to analyse how a user interacts with an application and, for example, how efficiently or otherwise a user is using an application. For example, if users A and B engage in navigation sessions that have the same startpoint 304 and endpoint 308, but user A has, for example, 5 more touchpoints than user B, then it could be inferred that user A is using the application inefficiently compared to user B.

In the above example, user A may be a novice, and therefore it could be determined that the application interface could be modified to assist novice users. Once the application is updated, a navigation session for the same user A (or group of novice users) can be analysed to see if the updated application had the intended effect on user efficiency. For example, if following the modification of the application interface the same user A used only 2 touchpoints 306 to get from the same startpoint 304 to the same endpoint 308 then it may be determined that the updated interface worked as intended to improve efficiency.

Figure 4:
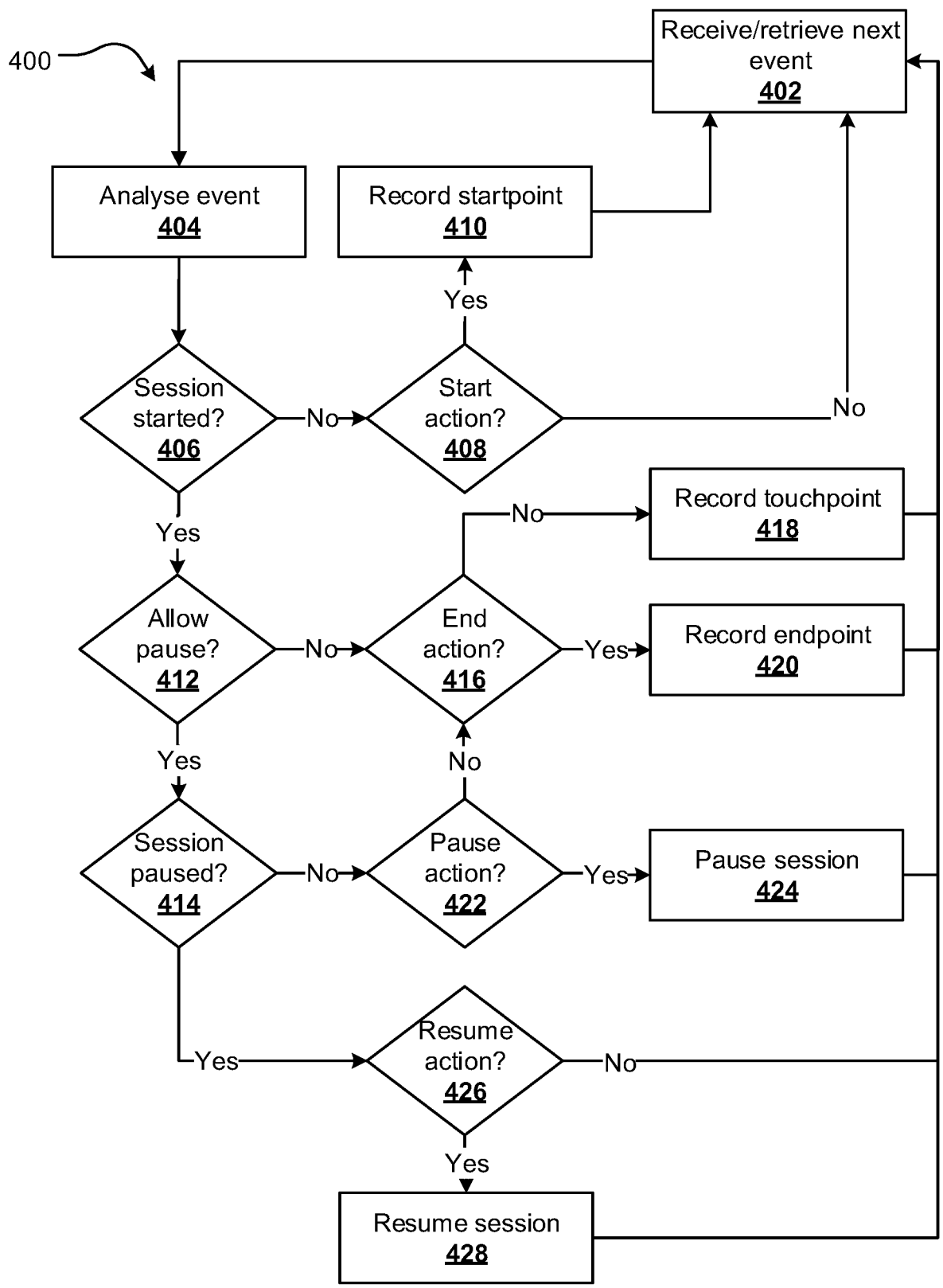
FIG. 4 is an example flowchart for determining a navigation session.

FIG. 4 illustrates an example process 400 for determining a navigation session (such as 302) including a startpoint (e.g. 304), zero or more touchpoints (e.g. 306) and an endpoint (e.g. 308).

Generally speaking, the navigation session system 106 may be configured to perform the processing of FIG. 4 in real time (e.g. by receiving and processing events as they are generated by a user, when the user is interacting with the application in question) or asynchronously (e.g. by accessing a log of events that was generated from user interactions with the application in question).

The method 400 commences at 402, where the navigation session system 106 either waits for and receives the next event to occur (in a real-time processing implementation) or retrieves a next event from a recorded event log (in a post-processing/asynchronous implementation).

The navigation session system 106 may, for example, receive events (either for real time processing or recording in an event log) by an event listener that listens for any events being fired at the application client 114.

At 404, the event received/retrieved at 402 is analysed by the navigation session system 106.

In certain embodiments, events may initially be analysed to determine if they are relevant events or not. If an event is not relevant (e.g. a type of event determined not to be relevant to the navigation session 302), the navigation session system 106 may discard the event and return to 402 without further processing. The navigation session system 106 may determine an event is not relevant in various ways. For example, the navigation session system 106 may be configured with a list of irrelevant event types (e.g. an event blacklist). If a type of the event being analysed is in the list of irrelevant event types the navigation session system 106 disregards the event as not being relevant.

If, at 404, the event is determined to be relevant, the navigation session system 106 may apply rules (defined, for example, in a ruleset) to determine if the event corresponds to a startpoint 304, touchpoint 306 or endpoint 308.

At 406, the navigation session system 106 determines if a navigation session is in progress (i.e. has already started). Importantly, an event can only be interpreted as a session startpoint if there is no navigation session currently in progress. From this it will be appreciated that in some cases a particular user interaction will generate an event that is interpreted as a startpoint (e.g. if the interaction occurs while there is no navigation session already in progress). In other cases, however, the same user interaction will generate an event that is interpreted as a touchpoint (or even endpoint), e.g. if the interaction occurs while a navigation session is already in progress.

If a navigation session 302 has not started, at 408 the navigation session system 106 determines if the event is one that will start a navigation session. As a general condition, a navigation session commences where a user performs an action that the system is configured to interpret as an intention to navigate and where the action is not part of an ongoing navigation session.

Generally speaking, the navigation session system 106 can be configured to interpret any user interaction with a user interface control as a session start action. Therefore the startpoint 304 of a navigation session 302 can be defined by a number of session start actions. Such actions include, for example, interacting with menu controls, button controls, project and board switcher components, dropdown menus, and or other user interface elements. Such actions may be recorded in, for example an event whitelist—i.e. a list of event types that can be interpreted as corresponding to session start actions. In certain embodiments, search controls (e.g. controls that allow users to enter text and initiate a search based thereon) are excluded as session start actions.

In the example of an issue tracking system, session start actions may include user activation of controls such as: controls in navigation sidebars (global, product or containers), clicking on favourites or starred icon, opening dashboards page via the sidebar navigation, opening project directory via global navigation and opening the backlog page when in the agile board view of a project. In the Jira context, and in certain embodiments, the quick search, create issue, notification, help and personal settings are not considered session start actions.

If, at 408, the event is determined to be a startpoint, the navigation session system 106 records the event as a startpoint at 410. Processing then returns to 402 to await or retrieve the next event.

If, at 408, the event is not determined to be a startpoint, processing returns to 402 to await or retrieve the next event (without taking any action with respect to the current event).

If, at 406, navigation session system 106 determines that a navigation session is in progress (i.e. has already started), processing continues to 412. At 412, the navigation session system 106 determines if pausing is allowed in the navigation session. Pausing is an optional aspect of a navigation session. Where pausing is allowed, processing continues to 414.

If, at 412, the navigation session system 106 determines pausing is not allowed, processing proceeds to 416. At 416, the navigation session system 106 determines if the event is an end session action.

Generally speaking, the navigation session system 106 can be configured to recognise any user interaction with an associated user interface control as a session end action. The relevant actions in this respect are those that are a positive indicator of the user's navigational intent. That is, while the navigation session system 106 cannot measure the intent of the user directly, there are some actions or inactions which are more likely to indicate the user's navigational intention than others. A positive indicator is a sign or other indication that the user has found, or is likely to have found, what they were navigating to or is otherwise satisfied in whatever they were navigating for.

This disclosure contemplates session end actions that correspond to at least two types of positive indicators: actions and dwelling for a period of time. Not all actions will be positive indicators, and therefore not all actions are session end actions. For example, while updating an issue and the user pressing the back button on the browser or webpage are both actions, an action such as updating an issue is more likely to be a positive indicator of a navigational intent than the user pressing the back button.

A session end action therefore is an action that either corresponds to a positive indicator of end of a navigation session or an action that ends a navigation session (such as simply closing the application or browser). An endpoint of a navigation session can be defined by a number of session end actions. Any click performed on the page the user is on can be considered a session end action (in some embodiments there could be exclusions such as opening sub-task, opening issue from backlog, opening issue from board).

As indicated above, there are other ways in which the end of a navigation session can be determined. For example, a user on reaching their destination may dwell for a period of time on a page. If this amount of time is significant, this is a positive indicator that the user has found the page they are looking for. Therefore there may be timing related end of navigation sessions, such as where the user's active dwell time has met a predefined threshold.

In order to distinguish dwelling from inactivity the system may determine if the user is active while on a page. For example, it is possible to track mouse and keyboard interactions and the user changing tabs and applications or any other events. In doing so, the system can infer from such interactions that the user is actively consuming content. For example, if a user is just opening an issue and then moving away from the user device, the system will not determine an end session action due to dwell time as the user would not be actively moving their mouse or interacting with the keyboard.

There are other non-application related events that can be used to establish the end of a navigation session. For example, the user may open a new tab in their browser or click on an already open application tab in their browser. This implies that the events that are triggered by the browser such as a user opening a tab are available so that the navigation session provider can listen to them. If they are not available, then there may be similar browser level events that the navigation session provider can use to establish that a navigation session has ended.

If, at 416, the navigation session system 106 determines that the event is not an end session action, processing proceeds to 418 where the navigation session system 106 records the event as a touchpoint 306 of the existing navigation session. Processing then continues to 402 to await/retrieve the next event.

If, at 416, the navigation session system 106 determines that the event is an end session action, processing continues to 420. At 420, the navigation session system 106 records the action as the endpoint 308 of the navigation session. A new navigation session can then be started (if the appropriate event occurs).

For the purposes of determining the navigation session 302, the process may end at the determination of the endpoint. Although as described further below there may be analysis (such as that provided by the analytics module 110) of the navigation session to determine if the navigation session was a successful one.

Returning to 414, at this step, the navigation session system 106 determines if the session is currently paused. If the session is not paused, processing continues to 422 where the navigation session system 106 determines if the event is a pause session action. Pause session actions may include, for example, starting a search, or switching tabs on a browser.

If, at 422, the navigation session system 106 determines the event to be a pause session action, processing proceeds to 424 where the navigation session system 106 pauses the session. Once the session has paused, the navigation session system 106 enters a modified processing loop. In this modified processing loop the next event is received/retrieved (e.g. as per 402). Where the session is paused, however, the navigation session system 106 only analyses the next event to determine if it is a resume action (e.g. at 426). If so, the session is resumed (e.g. at 428). If not, the next event is received/retrieved and analysed to determine if it is a resume action and so forth.

If, at 422, the navigation session system 106 determines the event is not a pause session action, processing proceeds to 416 as described above.

At 426, the navigation session system 106 determines if the event is a resume session action. Resume session actions may include, for example, closing a search and/or switching tabs on a browser back to the original tab. If the event is a resume session action, processing continues to 428 where the navigation session system 106 resumes the session before proceeding to 402 to wait for another event or process the next event. If the event is not a resume session action, processing continues to 402 (without resuming the session) to receive or retrieve another event.

In this example, a resume session action is assumed to be different from an end session action. Although not depicted in FIG. 4, it is worth noting that in some embodiments it is possible that the system may resume a session and then determine if the same event that resumed the session is also an end session action. In this case, if the navigation session system 106 determines that the event is a resume session action processing will continue to 428.

The following is an extended scenario of a user using an issue tracking application (such as the Jira application). In this example scenario, a user intends to find a particular issue. It should be noted that this example includes descriptions from the user's point of view which is included for illustrative purposes and to give some context to the example. In practice, the system will only be able to make inferences of the user's intention from the available computer interactions.

In this example, the user initially clicks on a system dashboard control, which is the origin of the user's navigation journey. This launches the system dashboard and the navigation session system 106 recognises this as a session start action (and thus begins a navigation session). As a first action in the navigation session the user clicks on an issues and filters control within a product sidebar. The user then clicks on a "Reported by Me" filter, causing a list of issues reported by the user to be displayed. The user scans the issues, visually searching for their issue of interest but the user doesn't find what they're looking for after spending 20 seconds scanning the filter results. The period of time of 20 seconds is insufficient to trigger an end of the navigation session.

The user activates a control to open a quick search interface and types in their recollection of the name of the issue they are searching for. This starts a search session and the navigation session system 106 recognises this as a pause session action so temporarily pauses the navigation session. The fact that the user does not find what they are looking for in the previous step can be inferred from this step. That is, a user would not use a search if they had found what they are looking for. Having completed the search, the search results are inconclusive and user closes the search interface—this ends the search session. The navigation session system 106 recognises this as a resume session action and the navigation session can then be resumed.

The user then opens a star drawer to access one of their starred boards, which the user then scans, visually searching for their issue of interest. The user still doesn't find what they're looking for after spending 10-20 seconds scanning the board. Again the period of time of 20 seconds is insufficient to trigger an end of navigation session.

The user then goes to the backlog for the same board. The user finds the issue they were intending to navigate to. The user then dwells on the issue for 30 seconds while they review the content, which is sufficient dwell time to trigger an end of navigation session. (Alternatively, the user could have performed some action with respect to the issue—e.g. updated the issue, changed its status, assigned it to someone, which would also have triggered an end to the navigation session). The navigation session system 106 recognises this as an endpoint for the navigation session.

In this case, the navigation journey ends successfully.

The above is one example scenario of a user using an issue tracking application. However, it would be noted that this is complex and slight changes in user behaviour would potentially result in a different outcome. Therefore in order to process how a user is engaging with the application, the system utilises a higher level of conceptual categorisation of user behaviour.

The specific format and data recorded for a given navigation session will vary depending on implementation. By way of specific example, however, the table below provides an example JSON schema format for a navigation session that can be stored in the database:

```
{
    "env": "prod",
    "product": "jira",
    "subproduct": "software",
    "version": "1.0.0",
    "origin": "web",
    "platform": "web",
    "tenantIdType": "cloudId",
    "tenantId": "xxx",
    "userIdType": "yyy",
    "source": "navigationSession",
    "actionSubject": "navigationSession",
    "action": "sessionEnd",
    "attributes": {
        "originalEvent": {
            "type": "TRACK",
            "payload": {
                "action": "updated",
                "actionSubject": "board",
                "actionSubjectId": 12469,
                "source": "boardScreen",
                "containerType": "project",
                "containerId": "10311",
                "objectType": "issue",
                "objectId": 12469,
                "attributes": {
                    "navigationSessionId":
                        "5994f218-5890-4f81-a240-69017b17069e",
                    "projectId": 10311,
                    "boardId": 19,
                    "isIssueDetailVisible": false,
                    "boardType": "Agility",
                    "projectType": "software",
                    "actionSubject": "issue",
                    "updatedItems": [
                        {
                            "name": "status",
                            "oldValId": 10335,
                            "newValId": 10336
                        }
                    ],
                    "issueTypeLevel": 0,
                    "issueTypeId": 10215,
                    "namespaces": "path "
                }
            }
        },
        "navigationSessionId":
            "5994f218-5890-4f81-a240-69017b17069e",
        "location": "nextGenBoard",
        "locationsNavigated":
        "issueDetailOnBoard",
        "uiEventSequence":
        "boardSwitcherMenu switcherMenu
        opened,boardSwitcherMenu
switcherMenu opened,boardSwitcherMenu
switcherMenu opened,projectSwitcherMenu
switcherMenu opened,projectSwitcherMenu
switcherMenu opened,projectSwitcherMenu
switcherMenu clicked",
```

```
    "endReason": "userAction",
    "namespaces": "navigationSession"
  },
  "eventType": "track",
  "tabId": "a2681866-1914-450b-b4db-af3d4d9dc337",
  "sessionId": "1561014466357",
  "taskSessions": { }
}
```

Once a given navigation session has been established (for example as per the process of FIG. 4 above) a measure of navigational success for that session can be determined. Determining navigational success can take into account various data, such as:

- clicks (or other user interactions) during a navigation session
- time/duration of navigation session
- touchpoints traversed
- navigation session startpoint (and/or the action causing the navigation session to start)
- navigation session endpoint (and/or the action causing the navigation session to end)

Navigational success measures can be used to assess whether a user has been able to navigate through the application effectively and efficiently. Navigational success does not necessarily measure whether or not the user ended up at the destination they intended to but rather how the user navigated from the origin to the destination. This is because any navigation session can only be measured on events or actions available to the system, so the user may have intended to navigate to a calendar, but appears via system events to have only navigated to a board or vice versa.

In the present example, determining a measure of navigation success for a given navigation session involves calculating a navigation session metric for that navigation session. Navigation session system 106 can be configured to make use of various datapoints available from the application/user interface in calculating a navigation session metric (and then using that metric to determine navigational success). One example measure used to determine navigational success is a count of total clicks (or user interactions) from the startpoint of a navigation session to the endpoint of a navigation session. Alternative measures can, however, be used—for example a navigation session metric may be calculated based on a number of touchpoints traversed during the session, time (e.g. a navigation session duration), or a combination of these (and/or other factors).

In order to analyse the navigation sessions collectively, the analytics module 110 may be configured to categorise navigation sessions. In the present embodiment, navigation sessions are categorised according to startpoint and endpoint.

Each navigation session category is associated with one or more category success metrics. For example, each navigation session category may be associated with a threshold number of clicks (or user interactions) which is used to determine a degree of navigation success for a navigation session of that category. For example, a navigation session that starts at an issue and ends at the same issue can be associated with a successful threshold of 3 clicks. If the number of clicks recorded during the navigation session is less than 3 then the session will be considered successful. There may be additional metrics for partial success. For example, a second number can indicate a partially successful navigation. For example, if the partially successful threshold is 5 clicks, then a navigation will be partially successful if the number of user clicks or user interactions is greater than three but less than or equal to 5. Finally, there can be a measure for failure, which in this example would be any navigation session which has a number of clicks/user interactions greater than 5.

One means of associating a category of navigation sessions with a threshold click value would be to set threshold levels manually in line with how the user interface is designed to operate. There would necessarily be important considerations when setting these thresholds for determining success. For example, the success threshold for a given navigation session category may be set to 3 but the arrangement of the application/user interface may require more than 3 clicks to navigate between the startpoint and endpoint defined by the navigation session category. In this case, the navigation session would always be considered a failure.

A further means of associating a category of navigation sessions with a threshold is to set the thresholds based on statistically analysing the available data for the category. This may include determining the mean number of clicks, median number of clicks, and standard deviation. In general terms this means that a user can be measured against other users to determine how similar or different their experience was. For example, 50% of users may finish a navigation session from issue to issue within 3 clicks, a further 30% of users finish a navigation session from issue to issue within 7 clicks, and the remaining users can take up to 25 clicks. A user who clicked 11 times during the navigation session would be in the 20% of users who clicked more than 7 times.

To further illustrate determining navigational success, example navigation session category thresholds are provided in the following table.

| Session Category | Success | Partial Success | Failure |
| --- | --- | --- | --- |
| Issue to Issue | <3 | 3-5 | >5 |
| Issue to Board | <2 | 2-3 | >3 |
| Board to Backlog | 1 | NA | >1 |
| Failed Session (e.g. session abandoned or terminated by closing application) | NA | NA | >=0 (any failed session will always be a failure) |

In this case, once a navigation session has been determined (e.g. a navigation session end point is recorded a 420) the navigation session system 106 can categorise the navigation session based on the session startpoint (recorded at 410) and endpoint (recorded a 420). The navigation session system 106 then determines the success of the navigation session by comparing the number of user interactions (e.g. clicks) with the success criteria for the session category. For example, with reference to the example table above, a navigation session may, for example, be categorised as an issue to board session and have involved 3 user interactions. In this case the navigation session system 106 will determine the session to be a partial success.

A similar analysis could be done with navigation session touchpoints (or with certain touchpoints designated as relevant/important touchpoints), navigation session duration, and or other datapoints (or combinations of datapoints). For example, a user that traverses from a startpoint 304 to an endpoint 308 via say the board switcher control may be considered to be more successful over one who browsed to the board via other means.

Figure 5:
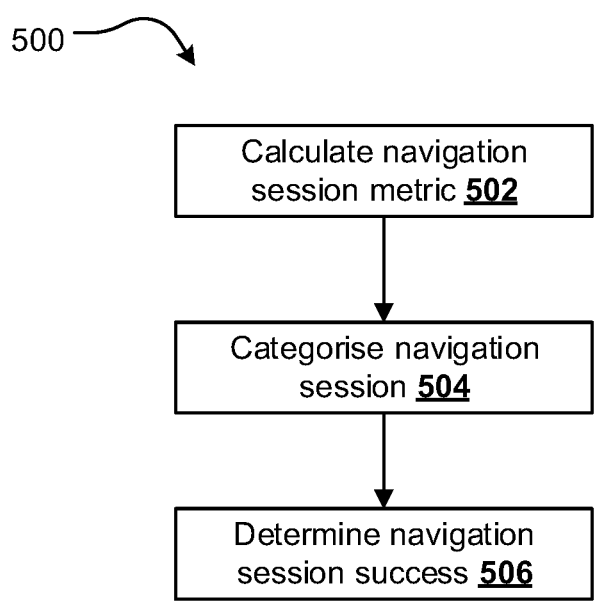
FIG. 5 is an example flowchart for determining a measure of success of a navigation session.

A process 500 for determining navigational success is generally shown with reference to FIG. 5.

At 502, the navigation session system 106 calculates a navigation session metric for a given navigation session. As described above, this metric may be a count of the clicks (or user interactions) that occurred in the navigation session, be based on a number of touchpoints traversed, based on time (e.g. a navigation session duration), or be a more complex metric taking a combination of these (and/or other factors) into account.

At 504, the navigation session system 106 determines a category for the navigation session. In the present embodiment, a navigation session is categorised based on its startpoint and endpoint.

At 506, the navigation session system 106 determines a measure of navigation success for the navigation session. This can be performed, for example, with reference to the navigation session metric calculated at 502 and the one or more success metrics (e.g. thresholds) associated with the particular category of the navigation session (as determined at 504).

It is possible to combine multiple analyses to determine a more accurate measurement of the user's navigational experience. For example, the system could look at both the relative number of sessions ended with a positive indicator (that is, disregarding for example prematurely closed sessions or failed sessions), and the quality (e.g. duration and linearity per start/end category). The system may encounter false negatives, that is, navigation sessions that ended according to the user but where the system determined that it did not (or ended in a different place, or ended as session because, for example, the user closed the browser). The system may also encounter false positives, where the system determined that the navigation session ended but the user had not finished navigating. However, these analytics even if not entirely correct can be still be used to determine navigational success and therefore can still be used to improve the user navigation experience.

Figure 6:
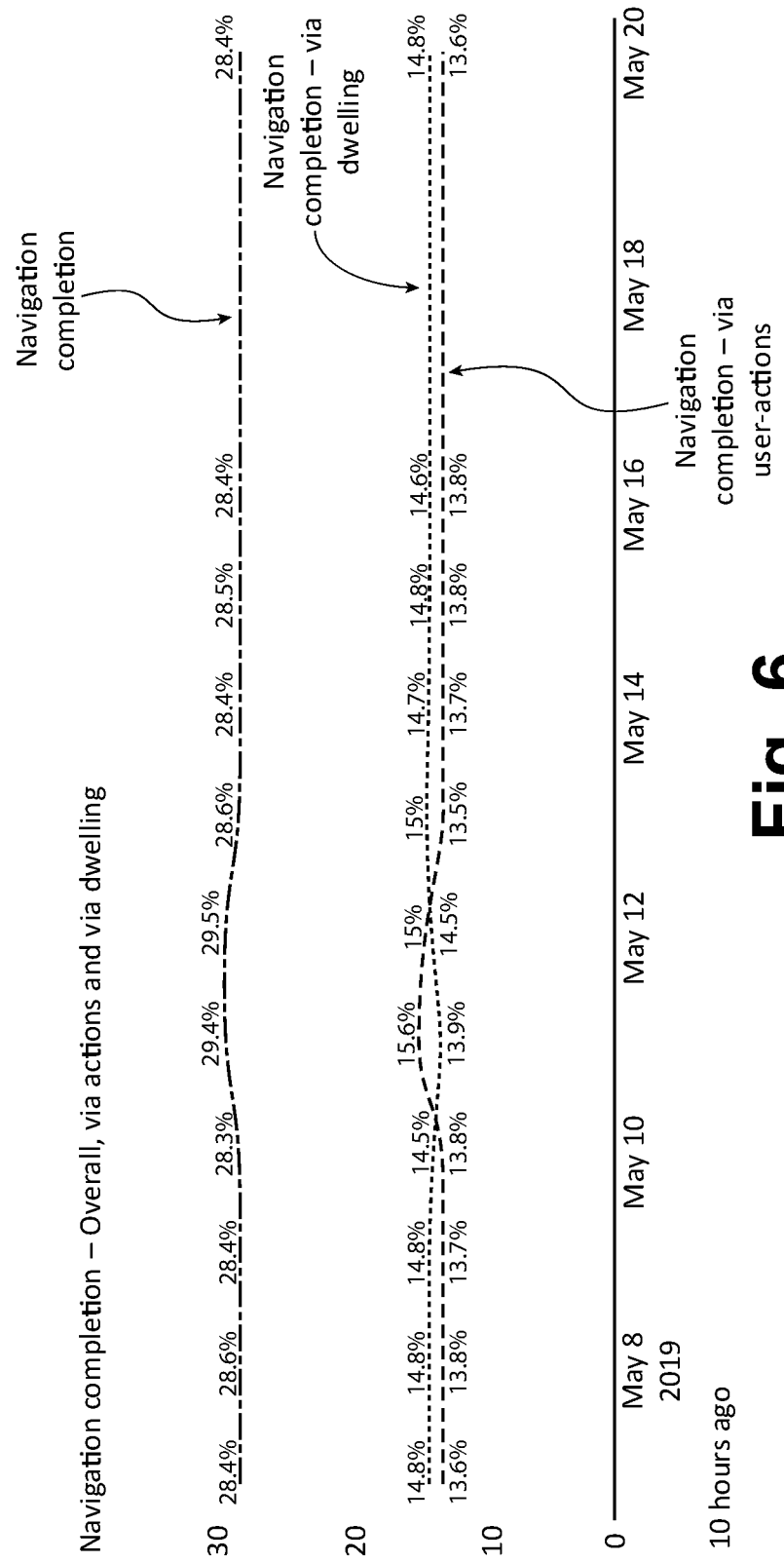
FIG. 6 is an example chart showing navigational completions over time.

The navigation sessions (and/or success measures thereof) can be used in various ways. For example, FIG. 6 provides an example graph that displays navigation completions for a group of users of an example application over a period of time. A navigation completion in this sense is a navigation session that ended either by dwelling on a page for a defined time period or by a specific action that end a navigation session. In this example, navigation sessions were completed successfully 28.4% of the time on May 7, and that success rate does not largely move over the course of almost two weeks.

Depending on the application in question, a success rate of 28.4 (or thereabouts) may be seen as low, and therefore indicate improvements to the application may be possible.

In the graph of FIG. 6, the navigation completions have been broken up into two categories: completion inferred from dwelling and completion inferred from user actions. As described above, navigation session completion via dwelling indicates that a user has spent a threshold period of time actively dwelling on a part of an application, such as a specific user screen or web page. By way of example, the dwell threshold may be set to 30 seconds, which generally is a sufficient amount of time for a user to fully comprehend the information on an application screen. This means that if the system detects a user has spent 30 seconds dwelling on an application screen it will be interpreted as a navigation endpoint (on the inference that the user has likely found the result they were looking for). If a user dwells on an application screen for less than the threshold dwell time and then navigates to another screen/page, the system will not interpret the dwell as a navigation endpoint.

Navigation session completion by user actions includes any navigation session with an endpoint defined by a specific user action. As described above, specific actions will end the navigation session because it is assumed that a user would not have performed the action unless it was the intended end of their navigation session. For example, a user updating an issue may be an action that is interpreted as ending a navigation session.

In the example of FIG. 6, it can be seen that approximately half of the navigation sessions were completed by dwelling and half were completed via user actions. The increase in navigation completions via user actions on May 11 for example may indicate that one or more features of the example Jira application were changed (though given completions returned to a similar level around May 13 this is unlikely to be the case).

More generally, a graph such as that shown in FIG. 6 can be generated and used as one datapoint to assess changes made in respect to an application's navigation. Such changes may be to the application itself (e.g. change in user interface layout, application layout, navigation tools that are available), changes to the help/training documentation for an application, and/or changed user behaviours following training sessions. For example, if a training session rolled out on date x, and following date x there was a significant increase in the number navigation completions, this may indicate that the training session was successful. Conversely, if a user interface change for an application was released on date y, and following date y there was a significant decrease in navigation completions, this may indicate the user interface change was not successful (though a longer term view could be considered, of course, to ensure this was not a short-term drop due to user acclimation to the change).

Figure 7:
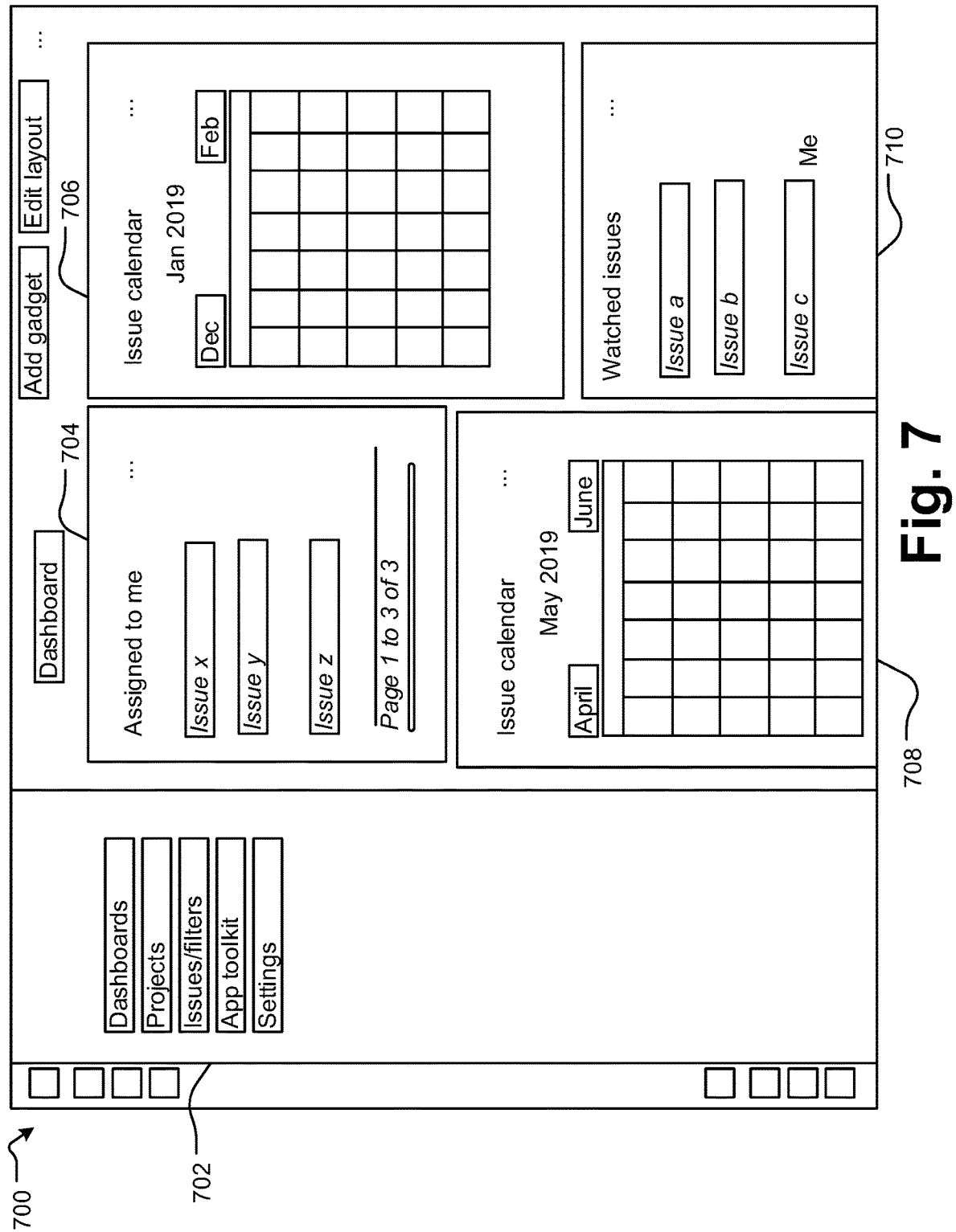
FIG. 7 is an example of a user interface of an example application.

FIG. 7 illustrates an example user interface 700 from which navigation events can be generated. In this example, there are many ways in which the user can interact with the application. On the left hand side, through a sidebar 702, the user is able to switch between dashboards, projects, issues and filters, an app toolkit and settings. A user clicking on any of those options may start a new navigation session (although events generated by interaction with the App Toolkit or settings controls may be examples of disregarded event types). On the right hand side, there are four components to the interface. There is a widget 704 which indicates the "assigned to me" tasks that are currently in Jira. There are two calendars 706 and 708 which are for monitoring the dates associated with Jira issues. There is also the watched issues widget 710 which shows issues the user may want to watch or monitor for any reason. Navigation sessions can be started from the user clicking on any of the widgets 704, 706, 708, 710 (or any user interface elements provided within those widgets). Given the multiple potential startpoints of the navigation session, there may be multiple potential endpoints. For example, the user clicking on a task widget 704 would likely be looking for a task to view or update. Therefore the potential endpoints of a successful navigation session may be determined to be task related. Similarly, the user clicking on the calendar widgets 706 or 708, may be looking for an issue to view, and therefore the potential endpoints of a successful navigation session started at the issues calendar may be determined to be issue related including viewing or updating an issue. The user clicking on the watched issues widget 710 may similarly be looking for an issue to view, and therefore the potential endpoints of a successful navigation session started at the issues calendar may be determined to be issue related including viewing or updating an issue.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. Although these flowcharts define steps in particular orders to explain various features, in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps. Still further, the functionality/processing of a given flowchart step could potentially be performed by various different systems or applications.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A computer implemented method comprising:
   receiving a navigation event generated at an application;
   processing the navigation event to determine if it is a start navigation session event, and in response to determining the navigation event is the start navigation session event, recording the navigation event as a startpoint of a navigation session;
   determining an end of the navigation session has occurred and, in response, recording an endpoint of the navigation session;
   calculating a navigation session metric for the navigation session;
   determining a particular category of the navigation session; and
   determining a measure of navigation success for the navigation session based on the navigation session metric and the particular category.

2. The computer implemented method of claim 1, wherein processing the navigation event to determine if it is the start navigation session event comprises determining that an action associated with the navigation event is a navigation session start action and determining that an existing navigation session is not in progress.

3. The computer implemented method of claim 1, wherein determining an end of the navigation session has occurred comprises:
   receiving a further navigation event;
   determining the further navigation event is an end navigation session event; and
   recording the further navigation event as the endpoint of the navigation session.

4. The computer implemented method of claim 1, wherein determining the end of the navigation session has occurred comprises determining that no further navigation event has occurred within a navigation session timeout period.

5. The computer implemented method of claim 1, wherein the navigation session metric for the navigation session is calculated based on a number of user interactions that occurred during the navigation session.

6. The computer implemented method of claim 1, wherein the navigation session metric for the navigation session is calculated based on a duration of the navigation session.

7. The computer implemented method of claim 1, wherein the navigation session metric for the navigation session is calculated based on a number of touchpoints determined during the navigation session.

8. The computer implemented method of claim 1, wherein the particular category of the navigation session is determined based on the startpoint of the navigation session and the endpoint of the navigation session.

9. The computer implemented method of claim 1, wherein the measure of navigation success for the navigation session is determined by comparing the navigation session metric to one or more success metrics associated with the particular category.

10. The computer implemented method of claim 9, wherein the one or more success metrics associated with the particular category are based on a statistical analysis of other navigation session metrics, each other navigation session metric being in respect of a navigation session determined to be in the same particular category.

11. A computer system comprising:
    a processing unit; and
    one or more non-transitory computer-readable storage media storing sequences of instructions which, when executed by the processing unit, cause the processing unit to:
    receive a navigation event generated at an application;
    process the navigation event to determine if it is a start navigation session event and, in response to determining the navigation event is the start navigation session event, record the navigation event as a startpoint of a navigation session;
    determine an end of the navigation session has occurred and, in response, record an endpoint of the navigation session;
    calculate a navigation session metric for the navigation session;
    determine a particular category of the navigation session; and
    determine a measure of navigation success for the navigation session based on the navigation session metric and the particular category.

12. The computer system of claim 11, wherein processing the navigation event to determine if it is the start navigation session event comprises determining that an action associated with the navigation event is a navigation session start action and determining that an existing navigation session is not in progress.

13. The computer system of claim 11, wherein determining the end of the navigation session has occurred comprises:
   receiving a further navigation event;
   determining the further navigation event is an end navigation session event; and
   recording the further navigation event as the endpoint of the navigation session.

14. The computer system of claim 11, wherein determining an end of the navigation session has occurred comprises determining that no further navigation event has occurred within a navigation session timeout period.

15. The computer system of claim 11, wherein the navigation session metric for the navigation session is calculated based on a number of user interactions that occurred during the navigation session.

16. The computer system of claim 11, wherein the navigation session metric for the navigation session is calculated based on a duration of the navigation session.

17. The computer system of claim 11, wherein the navigation session metric for the navigation session is calculated based on a number of touchpoints determined during the navigation session.

18. The computer system of claim 11, wherein the particular category of the navigation session is determined based on the startpoint of the navigation session and the endpoint of the navigation session.

19. The computer system of claim 11, wherein the measure of navigation success for the navigation session is determined by comparing the navigation session metric to one or more success metrics associated with the particular category.

20. The computer system of claim 19, wherein the one or more success metrics associated with the particular category are based on a statistical analysis of other navigation session metrics, each other navigation session metric being in respect of a navigation session determined to be in the same particular category.

* * * * *